(12) United States Patent
Issing

(10) Patent No.: US 8,755,931 B2
(45) Date of Patent: Jun. 17, 2014

(54) PICK-TO-WINDOW

(71) Applicant: SSI Schaefer Noell GmbH Lager- und Systemtechnik, Giebelstadt (DE)

(72) Inventor: Elmar Issing, Giebelstadt (DE)

(73) Assignee: SSI Schäfer Noell GmbH Lager- und Systemtechnik, Giebelstadt (DE)

( * ) Notice: Subject to any disclaimer, the term of this patent is extended or adjusted under 35 U.S.C. 154(b) by 0 days.

(21) Appl. No.: 13/783,904

(22) Filed: Mar. 4, 2013

(65) Prior Publication Data
US 2013/0253697 A1     Sep. 26, 2013

Related U.S. Application Data

(63) Continuation of application No. PCT/EP2011/062019, filed on Jul. 14, 2011.

(30) Foreign Application Priority Data

Sep. 2, 2010   (DE) .......................... 10 2010 044 614

(51) Int. Cl.
*G06F 7/00*     (2006.01)

(52) U.S. Cl.
USPC ........... 700/214; 700/213; 700/215; 700/216; 700/228; 700/226; 700/232

(58) Field of Classification Search
None
See application file for complete search history.

(56) References Cited

U.S. PATENT DOCUMENTS

2007/0043468 A1 * 2/2007 Schaefer et al. .............. 700/216

FOREIGN PATENT DOCUMENTS

| DE | 102004014378 | 10/2005 | |
|---|---|---|---|
| DE | 102007034705 | 1/2009 | |
| FR | 2713612 | 6/1995 | |
| FR | 2713612 A1 * | 6/1995 | ............. B65G 47/10 |
| WO | 96/36547 | 11/1996 | |
| WO | 2005/113389 | 12/2005 | |

OTHER PUBLICATIONS

International Search Report for corresponding patent application No. PCT/EP2011/062019 dated Oct. 12, 2011.

* cited by examiner

*Primary Examiner* — Yolanda Cumbess
(74) *Attorney, Agent, or Firm* — Renner, Otto, Boisselle & Sklar, LLP

(57) ABSTRACT

A work station for manually picking of piece goods, including a window conveyor which includes a plurality of optically distinguishable window locations. Each window location includes a defined region of the conveyor which is suitable for receiving a piece good. The conveyor extends through a picking zone and a provision region where different types of piece goods are provided at access locations. At the provision region the order-picking person can grasp piece goods manually from each of the access locations and put same on the conveyor. An order-picking control controls warehouse management and order processing in order to transmit information concerning one of the access locations and a removal quantity to the order-picking person in accordance with an order line of the picking order. A device is provided for allocating an unoccupied window location to one of the order lines based on selection and entry of the order-picking person.

23 Claims, 4 Drawing Sheets

Fig.1

PICK-TO-WINDOW

RELATED APPLICATIONS

This is a continuation application of the co-pending international application WO 2012/028371 A1 (PCT/EP2011/062019) filed on Jul. 14, 2011, and claiming priority of the German patent application DE 10 2010 044 614 A1 filed on Sep. 2, 2009, which are fully incorporated by reference herewith.

BACKGROUND OF THE INVENTION

The present invention relates to an order-picking work station having a window conveyor, to a storage and order-picking system having such an order-picking work station, and to a method for manually and paperlessly picking piece goods in accordance with a picking order consisting of at least one order line. In this context, it is picked in accordance with the "man-to-goods" principle.

RELATED PRIOR ART

Timm Gudehus describes in his book "Logistics" (Springer Verlag, 2004, ISBN 3-540-00606-0) an order-picking method under the term "pick-to-belt", wherein picking is performed in a decentralized manner including a static provision of articles. Provision units (e.g. storage containers) have a fixed location with the decentralized picking process. An order-picking person moves within a (decentralized) working region for the purpose of picking, wherein a certain number of access locations are located in the working region. Subsequent picking orders are steered to corresponding picking zones (working region of the order-picking person) on a conveyor, with or without collecting containers. An order, or picking order, is to be understood, for example, as a customer's order which is formed by one or more order positions (order lines) including a respective quantity (removal quantity) of one article type. The orders are stopped in the picking zones until required quantities of articles are removed and delivered. Then, the order can travel, if necessary, to a subsequent picker who operates a downstream located picking zone in order to process next order lines. Advantages of the decentralized picking process are: short paths and continuous operation; no setup times and waiting times at a central base; as well as a higher picking performance of the order-picking persons. Therefore, batch picking is frequently operated in accordance with "pick-to-belt", i.e. as many as possible customer's orders, which are containing a certain type of article, are concatenated so that the picker removes this article type for all of the customer's orders. This reduces the walking pas of the pickers, but requires, as a rule, an individualizing labeling of the removed articles so that a subsequent sorting device can distribute the articles to the respective customer's orders. The picker can mark each of the removed articles, for example, by means of an adhesive label and then place same on a belt, which does not need to comprise "windows". The process of labeling is work-intensive and slows down the order-picking process.

Another order-picking method, and order-picking guidance system, is designated by "pick-by-light" (source: Wikipedia). Pick-by-light offers significant advantages in comparison to classical, manual order-picking methods which require the existence of delivery notes or debit notes at the time of the order-picking process. With pick-by-light systems signal lamps having number displays, or also alphanumeric displays, as well as at least one confirmation button, and possibly enter and correction buttons are located at each access location. If the order container, into which the articles are delivered, for example, from storage containers, reaches an order-picking position, then a signal lamp is illuminated at the respective access location from which the articles or piece goods are to be removed, and the to-be-removed number occurs on the display. The removal is then confirmed by means of a confirmation button, and the inventory change can be fed back to the warehouse management system in real time. Pick-by-light systems in most cases are operated in accordance with the "man-to-goods" principle.

Further, a paperless order-picking process by means of "pick-by-voice" is known (source: Wikipedia). Communication between a data-processing system and the order-picking person takes place by means of speech. The order-picking person uses, for example, a headset (earphone and microphone) which, for example, can be connected to a commercially available pocket PC for the purpose of working, instead of printed order-picking lists or data-radio terminals (i.e. mobile data acquisition units, MDU). The orders are communicated from a warehouse management system to the order-picking person wirelessly, in most cases via WLAN/WiFi. Typically, a first speech output includes the rack from which piece goods are to be removed. If the order-picking person has arrived there, he/she can say a check digit which is mounted to the rack and which allows the system to conduct a check. If the right check digit is said, the order-picking person is informed on a removal quantity in terms of a second speech output. If the rack comprises a number of access locations the order-picking person, of course, is also informed on the tangible access location in terms of another speech output. After removal of the to-be-picked piece good, or the to-be-picked piece goods, the order-picking person confirms this process by means of key words which are understood by the data-processing device due speech recognition.

Besides the manual order-picking methods there are also automated order-picking methods. For this purpose, for example, automatic order-picking machines are used. An exemplary automatic order-picking machine is a so-called "A-frame" which is described, for example, in the document U.S. Pat. No. 5,271,703 B. An A-frame comprises a base frame having an A-shaped cross section. A so-called window belt extends through the legs of the A-shaped cross section. The window belt is typically an endless rotating belt conveyor, the belt of which, or the conveying surface defined by the belt, is virtually divided into a plurality of windows. Typically, a window is a region on the conveyor, which is 1-2 m long and can extend over the entire width of the belt. The window belt is preferably moved continuously through the A-shaped legs of the A-frame. One order is assigned to one single window or a number of windows dependent on its scope. If a window, or an order, passes an article shaft, which is mounted to one of the sides of the A-frame, dispenser units, which are provided at a lower end of each of the shafts, can discharge one or more articles, in accordance with the (window or) order just passing the shaft. The orders are allocated to the windows by an order-processing system, namely before the windows travel through the A-frame. In this context one also speaks of "window technology".

The order-processing system is typically integrated into an order-picking control which can also comprise, for example, an inventory management system. Further, (warehouse) location management as well as an information display can be integrated into the order-picking control. The order-picking control is typically implemented by a data-processing system which can be operated preferably online for transmittal and processing of data without delay.

It is true that a combination of an A-frame and window technology is possible, but is only suitable for a few order structures. A suitable order structure is characterized by as few as possible lines for each order, wherein the lines consist of bigger quantities of articles of the same type. Typically, A-frames are used with articles of category A, or so-called fast-moving items. Category A articles have a high turnover quantity, handling rate and access frequency. At the end of the order-picking control high efforts are undertaken for assigning the windows in advance to the orders, i.e. a long time before the windows or orders arrive in the actual order-picking region such as between the legs of the A-frame.

The window technology actually does only make sense for the picking of geometrically little articles such as pharmaceuticals or medical drugs. The utilization of the window technology upon picking of piece goods having bigger dimensions, or at high number of pieces, is typically not used in practice because the window size, in particular the window length, is too long if all of the piece goods belonging to one corresponding picking order are to be picked onto one single window in terms of a "pile".

Another problem is to be seen in that it might happen that (e.g., with regard to the quantity) not all of the piece goods are present for completing the picking order, i.e. are not present in the window.

If an order-picking person manually picks on a window, independent of the size of the window, there are problems. On the one hand it cannot be ensured reliably that the order-picking person actually places a removed piece good on the window previously assigned to the order. The placing of a removed piece good is difficult if the window belt is moved continuously. The placing is the more difficult, the faster the window belt moves. Besides this it is difficult to signal to the order-picking person exactly the window on which the removed piece good is just to be placed. Of course, it would be possible to print a running number onto the windows and to either optically or acoustically indicate to the order-picking person the window number assigned to the order. However, in this case there is always the danger that the order-picking person forgets the information on the destination, i.e. the target window on which the removed piece good is to be placed, during the (walking) path to the target window, or mixes up the window. In particular with a running numeration there exists the danger that the order-picking person supposedly means to know where the target window is currently located, but places, nevertheless, on a wrong window.

If multiple manual order-picking work stations are subsequently arranged in a downstream direction and are crossed by one and the same window conveyor, problems caused by false positioning, which occurred upstream, reproduce in the down-stream direction and may also be intensified. If a first picker in a first picking zone, which is located far upstream, places a piece good on a wrong window it might happen, with a corresponding window size, that a second picker, who is positioned further downstream, cannot put his/her piece good on the window allocated thereto, because the piece good of the first picker is already located there. In this case, the just to-be-placed piece good can either not be placed at all or only on another wrong window. In the last case, the faults are exponentiated.

The picker positioned further downstream must then signal to a computer responsible for material flow that a false picking process has occurred. Such false picking processes almost cannot be corrected. The order of the downstream positioned picker cannot be completed. The falsely positioned piece good must be discarded. The picking order, which belongs to the discarded piece good, must be determined. Thus, this picking order is not completed either. Additional picking orders are possibly affected, dependent on the scope of the false picking process. The non-completed picking orders need to be planned again by removing the falsely placed piece goods and leading them back, and by allocating new windows to the non-completed picking orders which then need to run again through the order-picking system.

SUMMARY OF THE INVENTION

Therefore, it is an object of the present invention to overcome the above-mentioned problems with manual picking when the window technology is used.

According to a first aspect of the invention a work station for manually and stationary picking of piece goods in a paperless manner by an order-picking person in accordance with a picking order is proposed, the work station comprising: a window conveyor having conveying means which comprises a plurality of optically distinguishable window locations, wherein each of the window locations includes a permanently defined region of the conveying means which is suitable for receiving of at least one of the piece good, wherein the window conveyor extends through a picking zone which is assigned to the order-picking person; a provision region, where different types of the piece goods are provided at a plurality of access locations, wherein the provision region is ranged relative to the window conveyor such that the order-picking person can grasp piece goods manually from each of the access locations and put same on the window conveyor; an order-picking control for controlling warehouse management and order processing in order to transmit information concerning one of the access locations and a removal quantity to the order-picking person in accordance with an order line of the picking order; and a device for allocating a free, and unoccupied, one of the window locations to one of the order lines based on selection and entry of the order-picking person, after the one of the order lines was communicated the order-picking person, wherein the free window location is occupied after the allocation.

According to a second aspect of the invention it is disclosed a work station for manually picking stationary provided piece goods in a paperless manner by an order-picking person in accordance with a picking order, the picking order comprising at least one order line, wherein the picking order is allocated to the picking person for processing the picking order line by line, wherein each of the order lines comprises a specific type of piece good and an associated removal quantity, the work station comprising: a picking zone assigned to the order-picking person; a window conveyor having conveying device, which comprises a plurality of optically distinguishable window locations, wherein each of the window locations corresponds to a permanently defined region of the conveying device which is configured for receiving of at least one of the piece goods, wherein the window conveyor extends through the picking zone; a plurality of access locations; a provision region, where different types of the piece goods are provided at the plurality of access locations, wherein the provision region is arranged relative to the window conveyor such that the order-picking person can grasp piece goods manually from each of the access locations and place same on the window conveyor; an order-picking control configured for controlling warehouse management and order processing in order to communicate information concerning one of the access locations and a removal quantity to the order-picking person in accordance with one of the order lines of the picking order; and an allocation device for allocating a free, and unoccupied, one of the window locations to the one of the order lines, based on selection and entry of the order-picking person after the one of the order lines was communicated the order-picking person, wherein the free one of the window locations is occupied after the allocation Contrary to the prior art the data association of a picking order, and in particular of an order line, to a window location (hereinafter also briefly designated as "window") happens only after the window conveyor has arrived at picking region which can comprise a plurality of picking zones. The allocation of at least one order line to at least one window location thus happens directly on site where the order-picking person (hereinafter also designated as "picker") actually works. A superordinated picking control then does not have any knowledge which one of the window locations of the window conveyor is assigned to one of the orders, or order lines, if the window conveyor enters the picking region of a storage and order-picking system. It is completely up to the picker on which one of the window locations one or more grasped piece goods are placed in accordance with a given removal quantity, as long as this window location is free and offers sufficient space for receiving the grasped piece good(s). Window locations are free if no piece good of another order, or of another order line, has been put there before, and thus no allocation of this window location to one of the order lines has occurred before.

The picker needs to be less concentrated during the placing of the piece goods, because it is up to him/her on which one of the free windows he/she places the piece good. He/she can freely select between window locations, which are not yet occupied, and thus does not need to wait for a window location preset by the superordinated control device. In this manner it is avoided that the picker places grasped piece goods erroneously on one of the windows, which has already been allocated to another picking order. Thus, in turn, it is prevented that correcting post-picking is required, i.e. wrongly put piece goods need to be removed and the orders, or lines, associated therewith need to be allocated again. Therefore, the picker needs to be less concentrated, because he/she does not need to find a window on the window conveyor, which was determined in advance by the picking control device. He/she simply selects the next best free window.

The window locations are clearly separated from each other optically and can be distinguished easily. Virtual windows cannot be seen by the picker so that in this case there is the risk that the picker places on a "wrong" window. Due to optically marking the individual windows in a visible manner the picker knows at any time where the windows begin and where they end.

The picking control device preferably comprises a pick-by-voice order-picking guidance system (hereinafter also briefly designated "pick-by-voice system") which is configured to inform the order-picking person acoustically on the access location and the removal quantity determined by the order line, and which is configured to communicate the allocation of the free window location by means of speech input of the order-picking person to the order-picking control.

An order-picking guidance system is to be understood as a system comprised of hardware and/or software components, and images an order-picking strategy to the reality, wherein the system guides the picker through the order-picking system for notifying him/her on the piece goods which are to be removed, the quantity, and where to place the removed piece goods. The individual components can be arranged in a distributed manner over the entire storage and order-picking system. Dependent on the embodiment components can be integrated into an order-picking control, as will be described in more detail below, or can be part of a warehouse unit (e.g., a rack) or a part of a technical equipment (e.g. headset or handheld terminal) of the picker.

The picking process, utilizing a pick-by-voice system, has the advantage that the picker uses his/her hands only for grasping and placing. The picker neither needs to push confirmation buttons for confirming a completed order, or a completed line, nor needs to notify any other information manually to a superordinated order-picking control. In addition, the pick-by-voice system is suitable for employees who speak different languages. Temporary staff and semi-skilled workers can rapidly handle pick-by-voice systems, since the systems are based on speech, and thus can be self-explaining. The picker only needs to learn the speech commands, for example, for communicating the processing of an order, or a line, acoustically to the order-picking control.

Another advantage of the pick-by-voice system is to be seen in that the picker can communicate to the order-picking control window-location identifying features (codes) such as an alphanumeric code, color code, symbol code, or the like, by means of speech inputs. Of course, also scanners, or similar code-reading devices, can be utilized alternatively for reading the features which are identifying one of the window locations unambiguously, and for transmitting same.

Alternatively to the pick-by-voice system the order-picking control can comprise a pick-by-light order-picking guidance system (hereinafter also briefly called "pick-by-light system") which is configured to activate and deactivate each of the access locations by means of an optical display device, and to optically display further the removal quantity. This can happen on site of the respective access location, or in a decentralized manner.

One advantage of guiding the picker by means of pick-by-light is to be seen in that access faults can be avoided almost by 100%. The access location from which piece goods are to be currently removed, for example, is the only illuminated one among a plurality of access locations. Thus, the picker is guided to the corresponding access location accurately. At the access location the quantity of piece goods, which are to be removed at the access location, is indicated to the picker, for example, by means of an optical digit display (LED, or the like).

The allocation of one of the window locations to the order, or to the line, can be done, for example, by means of a handheld scanner reading a barcode which is printed on the window location, if a pick-by-light system is used for indicating the access locations.

It is clear that the pick-by-light system can also be combined with the pick-by-voice system. In this case, for example, the access location is optically indicated (pick-by-light) or notified. The allocation of the free window locations can be performed acoustically (pick-by-voice).

With another advantageous embodiment each of the window locations is provided, at an arbitrary location, with a marker (e.g., at the beginning or end of the window with a metallic pin or stripe, a printed barcode, an affixed or worked-in transponder, etc.) which unambiguously represents a location of each of the window locations relative to the entire window conveyor.

Thus, calibrating and referencing of the window locations is possible. A corresponding sensor can be provided, for example, at the beginning and/or the end of the window conveyor, in order to be able to detect displacement of the window location, for example, due to slip of a belt, during one run of the window conveyor through the picking region. Thereby it is ensured that the order-picking control has knowledge of a current position of each of the window locations at any time. This information can be tracked ("tracking") by the order-picking control, i.e. it can be checked in the material flow at an arbitrary location. In this way it is ensured, for example, that downstream conveyor components have knowledge on the currently transported items, if the items are handed over between the conveyor components. The data association of the placed piece goods to the windows, on which or into which they are placed, which in turn is determined by the picker, is maintained in a downstream direction. The order-picking control preferably has additional knowledge of the conveying velocity of the window conveyor, of a respective size (width and length) of each of the window locations, and of the operation of the window conveyor (e.g., clocked or continuous) and the like.

With another advantageous embodiment each of the window locations is provided with a (machine-) readable unambiguous code, wherein the code preferably is distributed chaotically, i.e. not continuous in terms of 1, 2, 3, . . . and so on.

For allocating the window locations to the orders, or to the lines, it is necessary that the picker can unambiguously identify each of the window locations, thereby avoiding any false assignment. For example, the code can be implemented by a continuous numeration of adjacent window locations. With a continuous numeration, however, there is the risk that the picker already anticipates the window location currently approaching his/her current position. Thereby, however, the risk increases that the picker means to know which one of the window locations is free. He/she sees that, for example, the window location "12-03" is free, does not check the window location identifying code anymore, but indicates to the order-picking control the allegedly code, whether or not the free window actually carries the next higher code "12-04", because the picker has made a mistake during counting the windows up to the next free window. However, if the coding is chaotically, for example, in terms of a random digit (e.g., "11-03", "05-01" and then "07-01") for each of the window locations, wherein preferably no number is used twice, this risk can be excluded. The picker always needs to check explicitly, i.e. read, the actual code of the free window location. Thus, the fault rate is reduced, and thereby also the requirement of post-picking wrongly picked orders, or lines, is reduced.

As mentioned above the device for allocating a free window location can comprise an automated code-reading unit such as a handheld scanner or the like.

Also by this measure the fault rate is reduced. The picker needs to walk to the free window location for the purpose of allocating the free window location to one of the order lines, allowing reading of the identifying code. Since the reading process is performed in an automated manner, wrongly read window location identifications can be excluded reliably. Thereby, allocation of one free window location to one order line is free of error.

The device for allocating a free window location can also be implemented by a confirmation button.

The use of a plurality of confirmation buttons is noticeable in an advantageous manner, in particular during use of a picking-by-light order-picking guidance system. For this purpose the confirmation buttons can be arranged in, preferably regular, distances, for example, in the side plates of the window conveyor. The picker grasps an indicated quantity of piece goods from an indicated access location, and places the grasped piece goods on the next free window location, which is located on a same level of one of the confirmation buttons. The order-picking control registers the actuation of the confirmation button. In this case, the order-picking control has also knowledge on the picking window which is currently located at the position of the actuated confirmation button, and correspondingly executes the allocation "window location—order/line" ("marriage"). If necessary, the picker waits for an opportune time, in particular if the window conveyor moves continuously, so that there is no doubt on the window location, which is located on the level of the confirmation button (within a predetermined tolerance).

The conveying device can be realized by a cord belt, a member belt, a chain, or the like.

Further, it is advantageous if the window locations are separated from each other by means of optical and physical elements (projections, recesses in the conveying means, etc.) so that the order-picking person can distinguish them.

In this manner the order-picking person can rely on the window location on which he/she has just placed one or more of the piece goods. The picker is not supposed to think about the location where he/she can place one or more of the piece goods. He/she shall be able to act intuitively during the selection of the free window location. In this context, he/she is assisted in particular by physical separation elements avoiding, among other things, that the piece goods can "travel" between adjacent windows. The same is true, for example, with regard to rails which are mounted on the window conveyor transversely relative to the conveying direction, thereby preventing mixing of the piece goods placed on different window locations (e.g. due to inertia or slip).

A tray sorting device comprises, right from the start, visible and physical subdivisions. A tray sorter comprises a plurality of separate trays, which are connected to each other by means of a traction means and into which piece goods can be picked. A tray sorter has the advantage that it also allows simultaneous sorting, i.e. placed piece goods can be fed to their destinations without handing over the piece goods to a sorting device before.

According to a third aspect of the invention it is disclosed a storage and order-picking system having at least one work station in accordance with one of the preceding claims, wherein, preferably one single, window conveyor is provided connecting, in terms of material flow, the picking zones to the work stations.

According to a fourth aspect of the invention it is disclosed a storage and order-picking system having at least one work station comprising: a picking zone assigned to the order-picking person; a window conveyor having conveying device, which comprises a plurality of optically distinguishable window locations, wherein each of the window locations corresponds to a permanently defined region of the conveying device which is configured for receiving of at least one of the piece goods, wherein the window conveyor extends through the picking zone; a plurality of access locations; a provision region, where different types of the piece goods are provided at the plurality of access locations, wherein the provision region is ranged relative to the window conveyor such that the order-picking person can grasp piece goods manually from each of the access locations and place same on the window conveyor; an order-picking control configured for controlling warehouse management and order processing in order to communicate information concerning one of the access locations and a removal quantity to the order-picking person in accordance with one of the order lines of the picking order; and an allocation device for allocating a free, and unoccupied, one of the window locations to the one of the order lines, based on selection and entry of the order-picking person after the one of the order lines was communicated the order-picking person, wherein the free one of the window locations is occupied after the allocation; and further having a window conveyor connecting, in terms of material flow, the picking zones of the work stations.

With a preferred embodiment of the system each of the provision regions comprises flow channels, wherein each removal end of flow channels represents one of the access locations, wherein the flow channels are filled with the piece goods in an automated manner at their respectively opposing ends, preferably by one sort only and without load supports.

Thus, only the picking process is performed manually. The refilling of the channels is performed in an automated manner. The refilling of piece goods into the channel is, preferably, also performed in an automated manner by using, for example, gravity roller tracks or the like in order to implement the flow channels. Flow channels can be characterized in that they comprise a little downward slope relative to a horizontal line so that the piece goods automatically slip towards the access locations.

Further, it is advantageous if the system further comprises a sorting device which is connected, in terms of material flow, to the at least one work station of the invention, and which is configured to distribute piece goods (orders or lines), which have been placed on the window conveyor, to a plurality of destinations.

The sorting device can additionally sequence, if required. The sorting device collects, for example, order lines to form one order at the destinations. Therefore, it is possible to distribute the order lines for the purpose of picking (concentrating of piece goods) without any order, i.e. sequence, to the work stations. Thus, it is not required that picking orders are given to the work stations in terms of one coherent package. The order lines of different picking orders can be communicated to the work stations in a mixed manner. The concatenation of the orders then happens downstream relative to picking area.

According to a fifth aspect of the invention it is disclosed a method for manually and paperlessly picking piece goods in accordance with at least one order line of an existing picking order comprising the steps of: allocating the picking order to an order-picking person for processing the picking order line by line; communicating one access location and one removal quantity to the order-picking person in accordance with one of the order lines which is just to be processed; the order-picking person moves to the communicated access location and grasps the removal quantity of the piece goods from the access location; while the order-picking person moves and/or grasps, but at the latest after the order-picking person has grasped at least one first one of the piece goods of the removal quantity, the order-picking person selects a free one of a plurality of window locations of a window conveyor, which has not yet been occupied, wherein the window conveyor extends through a picking zone which is assigned to the order-picking person; informing the order-picking control on the selected window location; and placing the grasped piece good or piece goods on the selected window location.

According to a sixth aspect of the invention it is disclosed a method for manually and paperlessly picking piece goods at a work station in accordance with at least one order line of an existing picking order comprising the steps of: allocating the picking order to an order-picking person for processing the picking order line by line; communicating one access location and one removal quantity to the order-picking person corresponding to one of the order lines which is just to be processed; the order-picking person moves to the communicated access location and grasps the removal quantity of the piece goods from the access location; while the order-picking person moves and/or grasps, but at the latest after the order-picking person has grasped at least one first one of the piece goods of the removal quantity, the order-picking person selects a free, and unoccupied, one of a plurality of window locations of a window conveyor, which has not yet been occupied, wherein the window conveyor extends through a picking zone which is assigned to the order-picking person; informing the order-picking control on the selected window location; and placing the grasped piece good or piece goods on the selected window location.

Preferably, the picking-order person confirms the placing of the piece good(s) to the order-picking control.

Further, it is advantageous, if the communicating, moving, grasping, selecting, informing and placing is repeated so many times until each line of one order is picked. In particular, the communication of the access location and the removal quantity, the communication of the selected window location, as well as, if necessary, the confirmation happens acoustically, preferably by using a pick-by-voice-order-picking guidance system.

In addition, it is advantageous if the communication of the access location and the removal quantity happens optically, preferably by using a pick-by-light order-picking guidance system.

With another advantageous embodiment the selected window location is signaled to the order-picking control by a sensor monitoring the window conveyor in the picking zone and being configured to transmit a signal to the order-picking control, which identifies the window location into which or on which the order-picking person has just placed one or more of the piece goods.

Possible sensors for such applications are, for example, weight sensors. The weight sensors can be distributed over the length of the window conveyor beneath a conveying plane. As soon as the piece good(s) is/are placed on a free window location, this is detected by the weight sensors and signaled to the order-picking control. In this case, the order-picking control has knowledge of a respective current position of each of the window locations as well as on the (stationary) position of the weight sensors. Further, the window can be determined into which the picker has just placed the piece good(s). Alternatively, a camera could be used which monitors the picking zone correspondingly. The placing positions could be determined by means of image processing.

BRIEF DESCRIPTION OF THE DRAWINGS

It is clear that the above-mentioned and hereinafter still to be explained features cannot only be used in the respectively given combination but also in other combinations or alone, without departing from the scope of the present invention.

Embodiments of the invention are illustrated in the drawings and will be explained in more detail below.

PREFERRED EMBODIMENTS OF THE INVENTION

Figure 1:
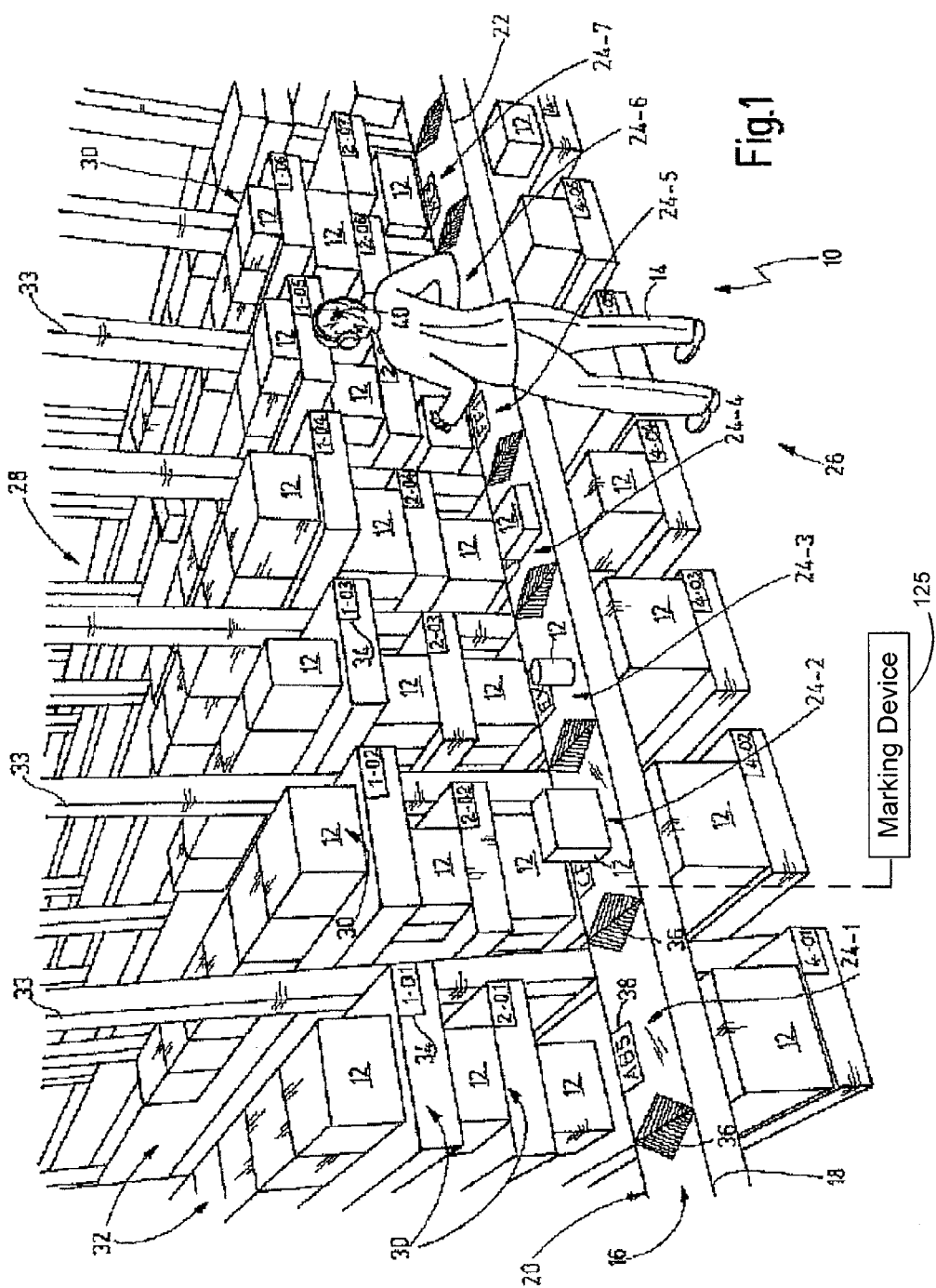
FIG. 1 shows a perspective view of a work station in accordance with the present invention.

In the following description of the figures identical features will be designated with identical reference numerals. Differences between different embodiments of features will be explained explicitly.

FIG. 1 shows a perspective view on one work station 10 in accordance with the present invention.

The work station 10 serves for picking piece goods (collis) 12 such as food cartons, beverage containers, pallets, or the like. The work station 10 can be operated with or without load supports (containers, trays, etc.). At the work station 10 in accordance with the present invention also piece goods 12 of different dimensions can be picked manually, i.e. by hand, which cannot be handled by picking automatons (such as an A-frame).

The work station 10 is operated by an order-picking person, or picker 14, who works in accordance with the "man-to-goods" order-picking principle. The picker 14 can walk back and forth along a window conveyor 16. The window conveyor 16 illustrated in FIG. 1 can be implemented by a chord conveyor, or chord-belt conveyor, 18, the conveying means 20 of which is an endless rotating chord belt 22. The conveying means 20 is divided into a plurality of window locations 24 which are arranged directly adjacent to each other, in particular continuously. However, distances between adjacent ones of the window locations 24 can also be provided. The window locations 24 are respectively regions, i.e. typically areas, on the window conveyor 16 having permanently-preset lengths and widths (also heights, if necessary). The width typically corresponds to the geometrical width of the window conveyor 16. This data is stored for the purpose of controlling.

Preferably, all of the windows 24 are sized equal. In FIG. 1 seven windows 24-1 to 24-7 are explicitly shown. Respectively one (different) piece good 12 is placed on the windows 24-2 to 24-4. The window conveyor 16 ideally moves continuously. However, the window conveyer can also be moved in a clocked manner. Moving in a clocked manner is always advantageous if no pick-by-voice system is used, as it will be described in more detail below, in order to allocate a free window location 24 to an order, or order line. It is preferred to place only one single piece good 12 per window location 24. This reduces the picking fault rate. The picking performance of the window conveyor 16 can reach up to 3,000 to 4,000 piece goods each hour. Each of the window locations 24 may be provided with a marking device 125 (diagrammatically shown in FIG. 1) which allows calibration of the plurality of the window locations.

For allowing placing the piece goods 12 on the windows 24, the picker 14 moves in his/her associated picking zone 26, i.e. within a working region having, preferably fixed, spatial boundaries. As a rule, the picker 14 walks. However, he/she can also drive. The picking zone 26 defines a region within which the picker 14 moves and may remove piece goods. Each of the picking zones 26 comprises a plurality of access locations 30, which are also part of a provision region 28. The window conveyor 16 extends through the picking zone 26 such that the picker 14 can remove the piece goods 12 from the access locations 30 in an ergonomically positive manner, and can place the removed piece goods 12 on the window conveyor 16. The provision region 28 is a space adjacent to the picking zone 26 and can overlap with the picking zone 26. The provision region 28 is used for an immediate provision of the piece goods 12 which are to be picked in the near future. The provision region 28 thus represents a type of a piece-good buffer which can be different to a storage region where the piece goods are long-term stored.

The access locations 30 illustrated in FIG. 1 can be the respective ends of a plurality of flow channels 32 which will be described in more detail in the context of FIG. 5. Instead of the flow channels 32 other storage devices such as (container) racks, pallet provision locations, or the like can be used as well. The flow channels 32 can be realized in terms of inclined gravity roller tracks, or driven horizontal belt conveyors, in order to exemplary list only some types. The flow channels 32 serve for providing and supplying the piece goods 12, which are to be picked. Typically each of the access locations 30 is filled by one sort only, i.e. piece goods 12 of one sort or one individual type (of goods) are located there. The channels 32, and thus the access locations 30, can be arranged on top of each other, and/or side-by-side, and are arranged preferably adjacent to each other. In the example of FIG. 1 the channels 32 are arranged on four levels. The flow channels 32 can be mounted to rack poles 33.

Each of the access locations 30 preferably comprises one dedicated access location identification 34, as exemplarily shown in FIG. 1 in terms of an (adhesive) label including an access location number. In FIG. 1, the access-location number is generated, for example, on the basis of the levels (1-4) and a propagating location number (01-n). In FIG. 1 the upper level represents, for example, the first level 1. The access location numbers propagate from left to right. The lowest level of the four levels can be located beneath the window conveyor 16. This level can either be used for providing the piece goods 12, which are required less frequently (articles of category C). Alternatively, some or all of the lower flow channels 32 of the fourth level can be used as return channels for (empty or no longer required) load supports on which the piece goods 12 are transported to the work station 10 in the upper three levels, if load supports are used. However, preferably no load supports (such as trays, containers, cartons, or the like) are used. The order-picking process is preferably performed without load supports.

As soon as the picker 14 has grasped one of the piece goods 12 from one of the access locations 30 (hereinafter also briefly designated "provision location"), he/she places same on a free, and unoccupied, window location 24. The window locations 24 are separated from each other by (optical) window markers 36. In the example of FIG. 1 the window markers 36 are realized by prints having, for example, a triangular base area. The triangles are orientated such that the tips thereof are directed towards the center of the associated window location 24. It is clear that other types of window marker 36 can be used such as separation rails extending along a boundary of adjacent window locations 24. Further, it is clear that the optical and physical separation features can be used in common or in an isolated manner.

The window locations 24 can be provided further with additional identification features such as printed codes 38. In the example of FIG. 1 the codes 38 are formed, for example, by two letters in combination with one number. The sequence of letters and numbers preferably is selected chaotically for making it more difficult for the picker 14 to anticipate the code of the next free window location 24. Thereby the picker 14 is urged to actively read the identification feature for communicating same later to a superordinated order-picking control, as will be described in more detail with reference to FIG. 2.

In the example of FIG. 1 the picker 14 can place the next to-be-grasped piece good(s) 12 either on the free window location 24-1, 24-5, 24-6, or 24-7. These window locations 24 are free, i.e. have not yet been occupied with one of the piece goods 12. Only the window locations 24-2 and 24-4 are occupied, in the present case exemplarily by respectively one single piece good 12.

The picker 14 can be equipped with a device 40 for allocating free window locations 24, which is carried by him/her. Alternatively, spatially-fixed units can be used as well such as confirmation buttons (not illustrated) which are integrated into the side plates of the window conveyor 16, weight sensors (not illustrated) being arranged beneath the window conveyor 16, or a camera being arranged above the window conveyor and monitoring the placement of the piece goods 12 in or on a free one of the window locations 24. The window locations can also be scanned.

In FIG. 1 the picker 14 carries a headset, which is used as the device 40 for allocating free window locations 24, the headset comprising an ear speaker and a microphone (not illustrated) allowing communication to a order-picking control (pick-by-voice and allocation of window locations by means of speech). The access location 30, from which the picker 14 has to fetch, i.e. grasp (pick), the next piece good(s) 12 is spoken to the picker 14 via the ear speaker. A removal quantity is also announced. In this case the picker 14 moves to the communicated access location 30 and removes a number of the piece goods 12 corresponding to the number announced in terms of the removal quantity. The picker 14 preferably selects the next free window location 24 on his/her way to the access location 30, or when the picker 14 has arrived at the access location 30, and notifies same by means of speech (allocation). For example, in FIG. 1 the picker 14 could have been notified on grasping one piece good 12 from the access location "1-05". Since the free window location 24-5 being designated by "FF1" is then located directly in front of the picker 14, the picker 14 could communicate this code to the order-picking control by means of speech input.

Figures 2, 3:
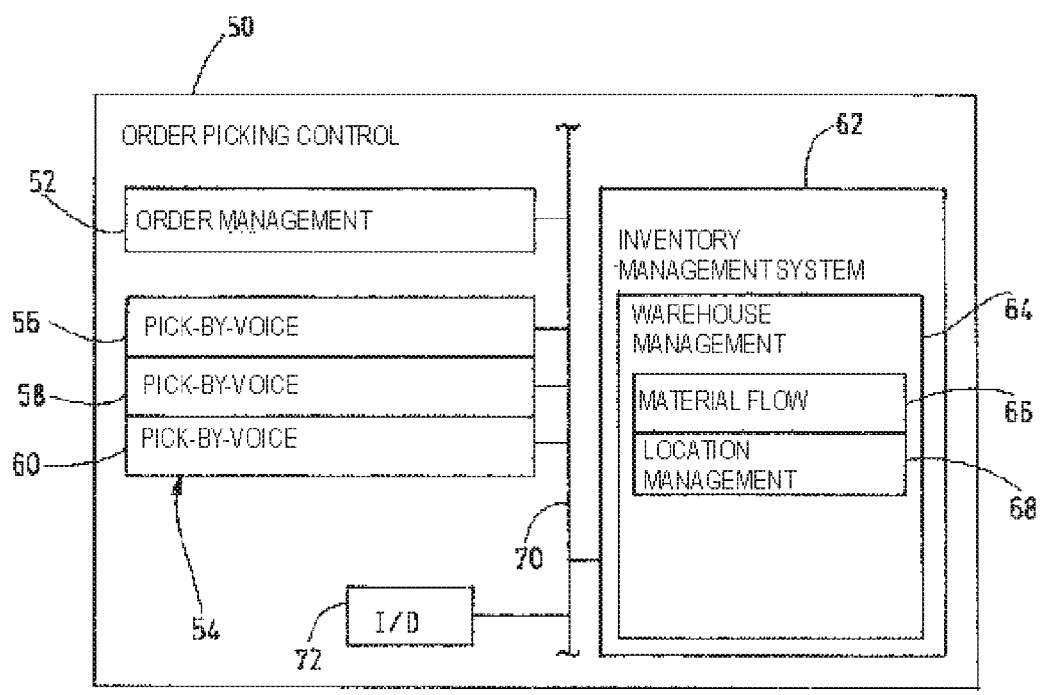
FIG. 2 shows a block diagram of an order-picking control as it can be used with the present invention.
FIG. 3 shows a picking order including information communicated by the order-picking control to the order-picking person.

A block diagram of the utilized order-picking control 50 is shown in FIG. 2.

The modular order-picking control 50 of FIG. 2 can comprise an order management 52, order-picking guidance strategies 54 (such as pick-by-voice 56, pick-by-light 58, pick-by-vision 60, or the like), a inventory management system 62 which in turn comprises a warehouse management 64 which in turn can regulate material flow 66 as well as location management 68, and an interface management 72. The different modules, which are mainly implemented in terms of software, can communicate with each other via a communication bus 70. The order-picking control 50 can be part of a central computer (not shown).

"Pick-by-vision" is to be understood as an order-picking method, wherein the picker 14 carries a data goggle projecting navigation pointers into the view of the picker 14 so that the picker 14 gets visually indicated where to go and how many piece goods 14 he/she has to remove from which one of the access locations 30.

The order management 52 takes care of incoming picking orders, wherein an exemplary picking order 80 is shown in FIG. 3, the incoming picking orders being distributed to the work station(s) 10 for being processed. In this context, factors such as work load, provided range of piece goods, path optimization, and the like are important. Entire orders, but also only individual order lines, can be allocated to the work stations 10 for being processed.

An exemplary (picking) order 80, as handled by the order-picking control, is shown in FIG. 3 and is designated by the order number "4711". A customer order (not shown) of one single customer typically comprises only the desired (goods/article) type names and the respectively desired quantity. The (system) order 80 of FIG. 3 comprises one or more lines 82, optionally a type designation 84, a removal quantity 86, as well as a storage or access-location number 88. The piece-good type 84, which is to be picked, and the corresponding quantity 86 (batch picking) are preset by the customer(s). The location number 88 is typically determined by the location management 68.

A customer order can be different to a (system) order 80 in that, preferably, batch generation has been applied to the system order 80, i.e. each of the customer orders, which contain a certain piece-good type, have been concatenated with regard to the removal quantity, for decreasing and minimizing the paths of the picker within the system. Then, the picker removes, for example, instead of 5 articles A and later 7 articles A, 12 articles A in one time and preferably places each of the 12 articles A on a dedicated one of the window locations 24. Each of the twelve window locations 24 in this manner "labels" one of the twelve articles A which can be subsequently distributed, for example, by means of a sorting device to the customer orders. The twelve window locations are tracked during their travel through the system allowing reliable handing over between different conveyor components.

If the term "order line" is used here, both a customer order line and an order line, which is generated during batch formation, can be meant. The allocation of a free and unoccupied one of the window locations to the order line, i.e. the marriage of one window to one or more placed piece goods, is dependent on how many piece goods are allowed to be placed on a respective window. Typically, one piece good 12 is placed on each of the windows 24. If one order line also indicates "12" as the removal quantity, twelve piece goods of this type are individually placed on twelve of the windows 24, and thereby are "married" to the twelve windows 24. All these variations are comprised by the expression "allocating a free and unoccupied window location to an order line".

The removal quantity 86 as well as the (access) location number 88 represents information 90 which is communicated by the order-picking control 50 to the picker 14. The communication can occur, for example, optically (cf. pick-by-light 58, or alternatively pick-by-vision 60 in FIG. 2) or acoustically (cf. pick-by-voice 56 in FIG. 2), after corresponding signals have been generated and communicated by the order-picking control 50.

Dependent on the technical equipment of a storage and order-picking system 100, as will be described in more detail with reference to FIG. 4, the access locations 30 are either indicated visually and/or acoustically. It is an object of the warehouse management 64 to take care of sufficient supply so that sufficient piece goods 12 are present at the access locations 30. The material flow control 66 determines the paths covered by the piece goods 12 within the system 100. The inventory management system 62 determines which of the piece goods 12 need to be re-ordered, because they are not present in the system 100 at all.

Figure 4:
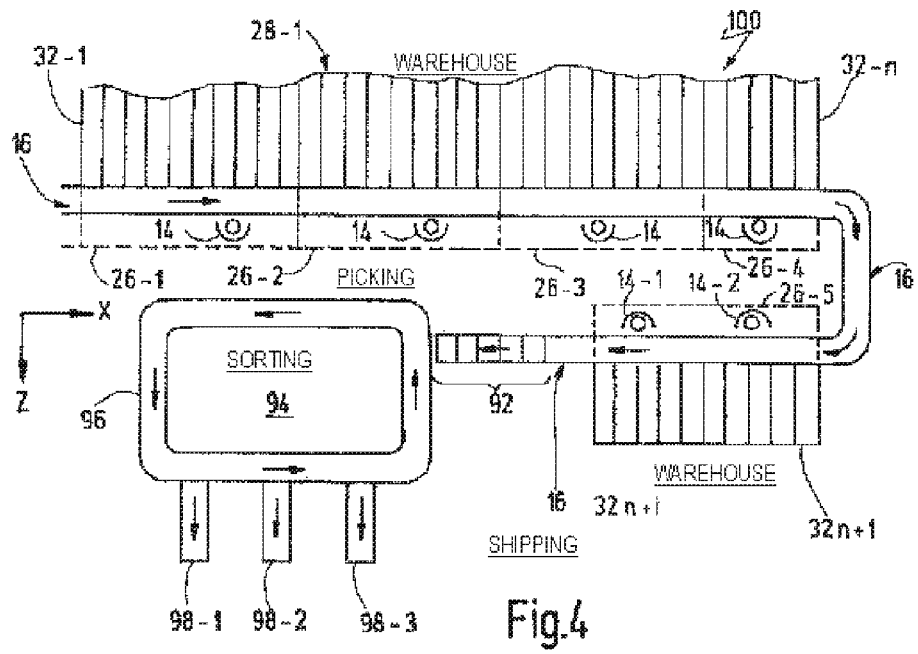
FIG. 4 shows a block diagram of a storage and order-picking system in accordance with the present invention.

With reference to FIG. 4 an exemplary embodiment of a storage and order-picking system 100 is shown.

The system 100 can comprise a number of picking zones 26. In FIG. 4 five picking zones 26-1 to 26-5 are shown. The first four picking zones 26-1 are located directly adjacent to each other and are respectively crossed by the window conveyor 16. Respectively one picker 14 works in each of the picking zones 26-1 to 26-4. However, multiple pickers 14 can also work within one of the picking zone 26, as exemplarily shown in the picking zone 26-5, where a first picker 14-1 and a second picker 14-2 work. The fifths picking zone 26-5 is located remotely to the first four picking zones 26-1 through 26-4 and is connected to the window conveyor 16 in a conveying manner.

The first four picking zones 26-1 to 26-4 are respectively located adjacent to a first provision region 28-1, which in turn can comprise a plurality of flow channels 32-1 to 32-*n*. Instead of the flow channels 32 a conveyor (not shown) for delivering and discharging storage containers (not shown) could run in parallel relative to the window conveyor 16. Alternatively, the provision regions 28 could also comprise individual pallet storage locations or the like.

Dependent on the work load at the picking zones 26 they could be further subdivided by the order-picking control 50, or alternatively concatenated, i.e. they could be made smaller or bigger, so that more or less pickers 14 could work along the window conveyor 16. This is particularly advantageous for compensating work load peaks. Book retailers often have order peaks during Easter time and Christmas time, which need to be short-term processed. In this case, the provision regions 28 can be filled with more piece goods 12 than usual. The piece goods 12 can be transferred for this purpose to the provision region 28 from a warehouse which can be located remotely relative to the work stations 10. The picking zones 26 can be operated with more pickers 14. More zones 26 can be established. Hence, the invention allows high flexibility and scalability.

The pickers 14 can also transitionally assist in another zone 26, if required. Each of the pickers 14 can log on and log out to the order-picking control 50 at the picking zone 26. The boundaries of the picking zones 26 can be defined variably by the order-picking control, if required.

Returning to FIG. 4, a clocked belt 92 can follow the window conveyor 16 thereby allowing feeding of the piece goods 12, which are placed on the window locations 24, not in a continuous manner but in a clocked manner to an optional distribution system 94, such as a sorting device 96. The sorting device 96 shown in FIG. 4 circulates endlessly and thereby crosses a plurality of destinations 98. Three destinations 98-1 to 98-3 are exemplarily shown in FIG. 4. Each of the destinations can be assigned to an entire order 80 while the orders 80, for example, are processed line-by-line so that picking lines 82 which belong to one picking order 80 and arrive in a disordered state at the sorting device 96, can be collected at the destinations 98, if the order lines 82 were distributed chaotically over the picking zones 26. Completed orders 80, i.e. if all of the piece goods 12 required for the processing of one of the orders 80, in accordance with the corresponding lines 82, have been collected, can be handed over from the destinations 98 to a shipping area, or can be shipped directly from the destinations 98.

Figure 5:
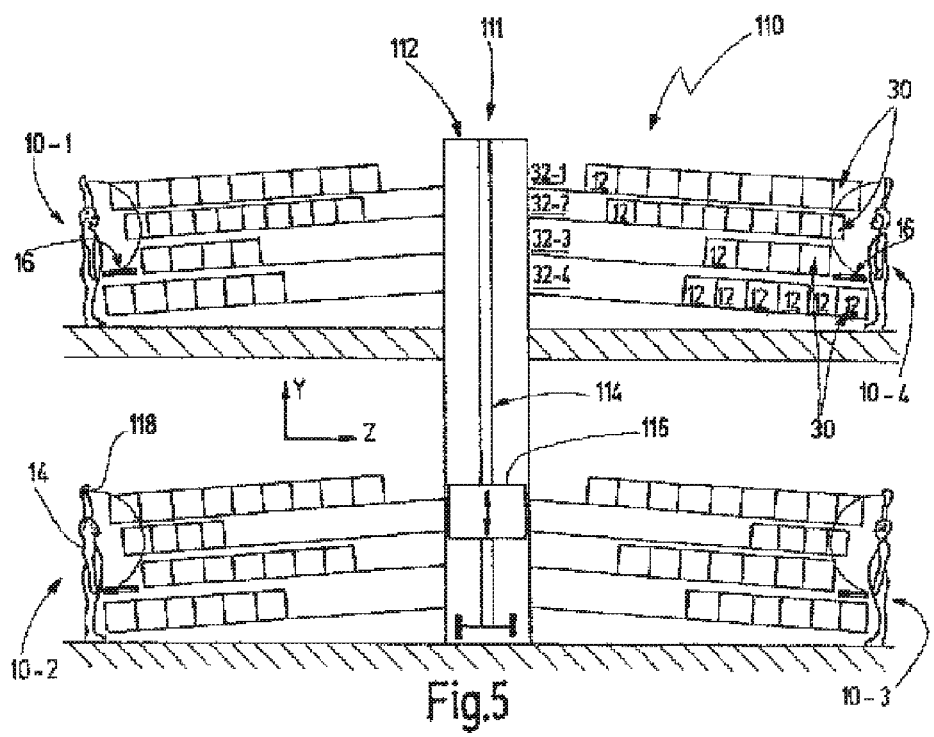
FIG. 5 shows a side view of four adjacently arranged work stations in accordance with the present invention, wherein a supply storage machine is arranged therebetween.

FIG. 5 shows a side view of another embodiment of the present invention. FIG. 5 exemplarily shows four work stations 10-1 to 10-4 which are arranged in the present case on two levels oppositely to a supply aisle (rack aisle) 111. A central serving unit 112 such as a storage and retrieval device 114 is provided in the supply aisle 111, the storage and retrieval device 114 being provided with a load-handling device 116 adjustable in height for filling the provision regions 28, which in turn are exemplarily represented by flow channels 32, with (supply) piece goods 12. The storage and retrieval device 114 can also travel horizontally, i.e. perpendicular to the drawing plane of FIG. 5 in order to allow supply of the picking zones 26 (cf. FIG. 4) arranged side-by-side.

The work stations 10-1 to 10-4 of FIG. 5 respectively comprise four levels of access locations 30. Preferably, all of the access locations 30 are arranged within range 118 of one arm, as indicated by a respective semicircle for each of the pickers 14. The window conveyor 16 is preferably located waist-high so that the picker 14 can work ergonomically. Heavy piece goods 12 are preferably provided over the channel 32-3, so that the picker 14 only needs to pull the piece goods 12 onto the window conveyor 16.

Figure 6:
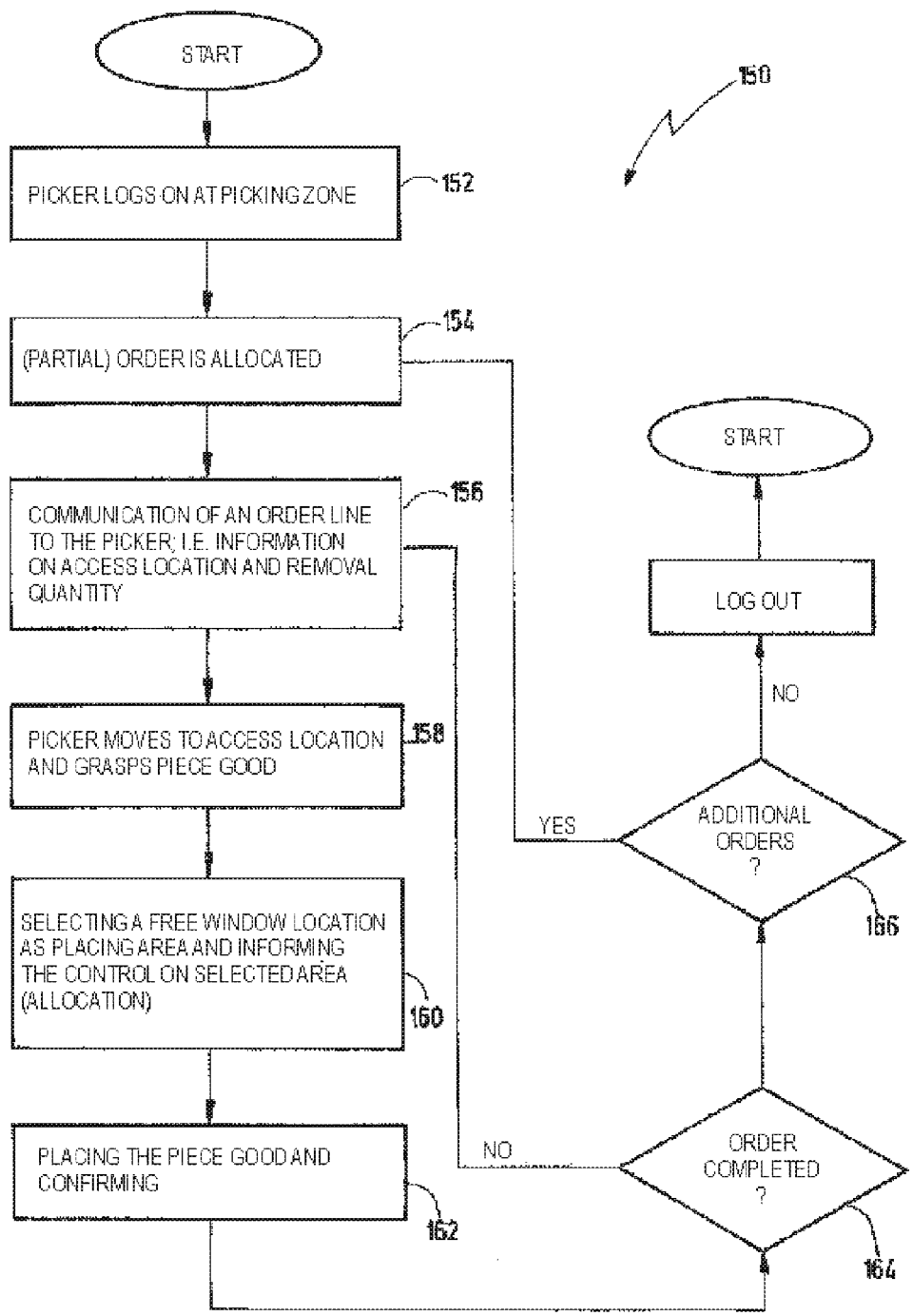
FIG. 6 shows a flow chart of a method in accordance with the present invention.

With reference to FIG. 6 a method 150 for manually and paperlessly picking piece goods 12 stationary in accordance with one picking order 80 by an order-picking person 14 is shown. It is to be noted that not all of the shown method steps are actually required for implementing the method 150 in accordance with the present invention. For example, the first step 152 is optional.

In accordance with the step 152 at the beginning of his/her shift the picker 14 logs on to the order-picking control 50 at one of the picking zones 26. The order-picking control 50 can then inquire whether all of the order lines 82, which possibly have already been allocated to the picking zone 26 before, have actually been processed. If "old" order lines 82 exist, they are re-allocated to the picker 14 who has logged-on newly.

In general, partial orders, or entire orders 80, preferably in terms of order lines 82, are allocated to the logged-on picker 14 (cf. step 154). In this context, the order-picking control 50 communicates the information 90 to the picker 14 in step 156. The information 90 comprises at least the removal quantity 86 as well as the access location 88. The communication can happen visually and/or acoustically.

As soon as the picker knows the access location 30, from which he/she has to grasp the next piece good(s) 12, he/she moves to this access location 30 in step 158. As soon as he/she has arrived there, he/she grasps the piece goods 12 in accordance with the corresponding removal quantity 86.

During movement and/or grasping, or at the latest after the picker 14 has grasped the piece goods 12, he/she selects a free window location 24 as placing location (cf. method step 160). The order-picking control 50 is informed on the selected window location 24. At this time the data allocation of the window location 24 to the order line 82 (marriage) occurs. This information can be of interest to a downstream sorting device 96, and thus for the distribution to the destinations 98. As mentioned above, the order-picking control 50 can be informed actively by the picker 14 on the selected window location 24, wherein the picker 14, for example, performs a corresponding speech input. Alternatively, buttons or sensors such as the above-mentioned exemplary weight sensors, or a monitoring camera having integrated image processing and object recognition, can be provided.

In step 162 the picker 14 places the grasped piece goods 12 on the selected window location 24, and can optionally confirm the placing process. The step of placing 162 and the step of selecting 160 can happen simultaneously, in particular if external sensors detect the placing, and thus the step of informing the order-picking control 50 on the selected window location 24, in an automated manner.

Then, in step 164 it can be inquired whether additional lines 82, which are to be processed, are expected for the picking zone 26. If additional lines 82 need to be picked, the control returns to the step 156. If the order 80 has been picked completely, in step 166 it is inquired whether additional orders 80 need to be picked. If additional orders 80 are to be picked, one returns to the step 154. If no additional orders 80 are to be picked, the picker 14 can log out and the method is terminated.

Therefore, what I claim is:

1. A work station for manually picking stationary provided piece goods in a paperless manner by an order-picking person in accordance with one picking order, the picking order comprising at least one order line, wherein the picking order is allocated to the picking person for processing the picking order line by line, wherein each of the order lines comprises a specific type of piece good and an associated removal quantity, comprising:
- a picking zone assigned to the order-picking person;
- a window conveyor having conveying device, which comprises a plurality of optically distinguishable window locations, wherein each of the window locations corresponds to a permanently defined region of the conveying device which is configured for receiving of at least one of the piece goods, wherein the window conveyor extends through the picking zone;
- a plurality of access locations;
- a provision region, where different types of the piece goods are provided at the plurality of access locations, wherein the provision region is arranged relative to the window conveyor such that the order-picking person can grasp piece goods manually from each of the access locations and place same on the window conveyor;
- an order-picking control configured for controlling warehouse management and order processing in order to communicate information specifying one of the access locations and a corresponding removal quantity to the order-picking person in accordance with one of the order lines of the picking order; and
- an allocation device for allocating a free, and unoccupied, one of the window locations to the one of the order lines, based on selection and entry of the order-picking person after the one of the order lines was communicated the order-picking person, wherein the free one of the window locations is occupied after the allocation; and
- wherein each of the window locations is provided with an unambiguous readable code.

2. The work station of claim 1, wherein the order-picking control comprises a pick-by-voice order-picking guidance system, wherein the pick-by-voice order-picking guidance system is configured to signal acoustically the access location, which is specified by the one of the order lines, and the removal quantity to the order-picking person, and wherein the pick-by voice order-picking guidance system is further configured to communicate the allocation of the free one of the window locations to the order-picking control by means of speech input of the order-picking person.

3. The work station of claim 1, wherein the order-picking control comprises a pick-by-light order-picking guidance system, wherein the pick-by-light order-picking guidance system is configured to activate and deactivate each of the access locations, in dependence on the one of the order lines, by means of an optical displaying device.

4. The work station of claim 3, wherein the pick-by-light guidance system comprises a display at each of the access locations for optically displaying the removal quantity.

5. The work station of claim 3, wherein the allocation device comprises a confirmation button.

6. The work station of claim 1, wherein each of the window locations is provided with a marking device which allows calibration of the plurality of the window locations.

7. The work station of claim 1, wherein the codes on the window locations are distributed chaotically.

8. The work station of claim 1, wherein the allocation device comprises a code-reading unit.

9. The work station of claim 1, wherein the window conveyor is driven continuously.

10. The work station of claim 1, wherein the conveying device is selectable from a group comprising at least one of: a chord belt; a member belt; a tray sorting device; and a chain.

11. The work station of claim 1, wherein adjacent ones of the window locations are separated from each other by means of at least one of optical and physical elements so that the order-picking person can distinguish same.

12. A storage and order-picking system having at least one work station comprising:
- a picking zone assigned to the order-picking person;
- a window conveyor having conveying device, which comprises a plurality of optically distinguishable window locations, wherein each of the window locations corresponds to a permanently defined region of the conveying device which is configured for receiving of at least one of the piece goods, wherein the window conveyor extends through the picking zone;
- a plurality of access locations;
- a provision region, where different types of the piece goods are provided at the plurality of access locations, wherein the provision region is ranged relative to the window conveyor such that the order-picking person can grasp piece goods manually from each of the access locations and place same on the window conveyor;
- an order-picking control configured for controlling warehouse management and order processing in order to communicate information concerning one of the access locations and a removal quantity to the order-picking person in accordance with one of the order lines of the picking order; and
- an allocation device for allocating a free, and unoccupied, one of the window locations to the one of the order lines, based on selection and entry of the order-picking person after the one of the order lines was communicated the order-picking person, wherein the free one of the window locations is occupied after the allocation; and further having a window conveyor connecting, in terms of material flow, the picking zones of the work stations; and
- wherein each of the window locations is provided with an unambiguous readable code.

13. The storage and order-picking system of claim 12, wherein each of the provision regions comprises flow channels respectively having a removal end, wherein each removal end corresponds to one of the access locations, wherein the flow channels are filled in an automated manner with the piece goods at their respectively opposing ends.

14. The system of claim 13, wherein the flow channels are respectively filled by one sort only and without load supports.

15. The storage and order-picking system of claim 12, further comprising a sorting device which is connected, in terms of material flow, to the at least one work station, and wherein the sorting device is configured to distribute the piece goods, which have been placed on the window conveyor, to a plurality of destinations, wherein each of the destinations is assigned to one picking order.

16. The method of claim 15, wherein the steps of communicating, moving, grasping, selecting, informing and placing are repeated so often until each one of the order lines of the picking order has been picked.

17. The method of claim 15, wherein the step of communicating the access location and the removal quantity, the step of informing on the selected window location as well as the step of confirming are performed acoustically.

18. The method of claim 17, wherein a pick-by-voice order-picking guidance system is used for the acoustical performance.

19. The method of claim 15, wherein the step of communicating the access location and the removal quantity is performed optically.

20. The method of claim 19, wherein a pick-by-light order-picking guidance system is used for the optical performance.

21. The method of claim 19, wherein the selected window location is signaled by a sensor to the order-picking control, the sensor monitoring the window conveyor in the picking zone and being configured to communicate a signal to the order-picking control identifying the window location on which the order-picking person has just placed one or more of the piece goods.

22. A method for manually and paperlessly picking piece goods at a work station in accordance with at least one order line of an existing picking order comprising the steps of:

allocating the picking order to an order-picking person for processing the picking order line by line;

communicating one access location and one removal quantity to the order-picking person corresponding to one of the order lines which is just to be processed;

the order-picking person moves to the communicated access location and grasps the removal quantity of the piece goods from the access location;

while the order-picking person moves and/or grasps, but at the latest after the order-picking person has grasped at least one first one of the piece goods of the removal quantity, the order-picking person selects a free, and unoccupied, one of a plurality of window locations of a window conveyor, which has not yet been occupied, wherein the window conveyor extends through a picking zone which is assigned to the order-picking person;

informing the order-picking control on the selected window location; and placing the grasped piece good or piece goods on the selected window location; and wherein each of the window locations is provided with an unambiguous readable code.

23. The method of claim 22, wherein each of the window locations receives one piece good of the removal quantity so that for each of the order lines respectively one free window location is allocated as dictated by the removal quantity.

* * * * *